United States Patent
Chen

(10) Patent No.: US 8,833,670 B2
(45) Date of Patent: Sep. 16, 2014

(54) INTELLIGENT THERMOSTATIC WATER OUTFLOWING DEVICE

(76) Inventor: Qiyue Chen, Qinggang Town (CN)

( * ) Notice: Subject to any disclaimer, the term of this patent is extended or adjusted under 35 U.S.C. 154(b) by 1015 days.

(21) Appl. No.: 12/936,668

(22) PCT Filed: May 8, 2010

(86) PCT No.: PCT/CN2010/072543
§ 371 (c)(1),
(2), (4) Date: Oct. 6, 2010

(87) PCT Pub. No.: WO2010/133137
PCT Pub. Date: Nov. 25, 2010

(65) Prior Publication Data
US 2011/0120574 A1    May 26, 2011

(30) Foreign Application Priority Data

May 20, 2009   (CN) ...................... 2009 2 0154708 U

(51) Int. Cl.
*G05D 23/13* (2006.01)
*F16K 11/087* (2006.01)

(52) U.S. Cl.
CPC .................................. *G05D 23/1393* (2013.01)
USPC ................. 236/12.17; 236/12.12; 137/625.41

(58) Field of Classification Search
USPC ................ 236/12.12, 12.17; 137/468, 625.41
See application file for complete search history.

(56) References Cited

U.S. PATENT DOCUMENTS

| | | | |
|---|---|---|---|
| 6,913,203 B2 * | 7/2005 | DeLangis | 236/12.12 |
| 2008/0072969 A1 * | 3/2008 | Maercovich | 137/455 |

FOREIGN PATENT DOCUMENTS

| | | | |
|---|---|---|---|
| CN | 1068869 A | | 2/1993 |
| CN | 2685676 Y | * | 3/2005 |
| CN | 201014041 Y | * | 1/2008 |
| CN | 101368646 A | * | 2/2009 |
| KR | 2003-0028690 A | | 4/2003 |
| KR | 2003028690 A | * | 4/2003 |

OTHER PUBLICATIONS

International Search Report for the Application No. PCT/CN2010/072543 mailed Aug. 12, 2010.

* cited by examiner

*Primary Examiner* — Chen Wen Jiang
(74) *Attorney, Agent, or Firm* — Minder Law Group; Willy H. Wong

(57) ABSTRACT

The present invention discloses an intelligent thermostatic water outflowing device in the field of sanitary wares. By using said intelligent thermostatic water outflowing device, the defects of the current thermostatic water outflowing devices are overcome, such as a relatively complicated whole structure, a high cost and a poor applicability to ordinary valves. The intelligent thermostatic water outflowing device of the invention comprises a body provided with a hot water inflowing passage, a cold water inflowing passage and a water outflowing passage, and a valve core assembly provided between the cold water inflowing passage, the hot water inflowing passage and the water outflowing passage within the body. The present device further includes a motor, a water temperature control circuit and a temperature sensor. The valve core rod of the valve core assembly is connected with the output shaft of the motor fixed within the body. The temperature sensor is placed in the water outflowing passage and connected with the water temperature control circuit. The water temperature control circuit is connected with the motor and has an external power source connected thereto for supplying the power. The operation of the motor could be controlled by the water temperature control circuit according to the outflowing water temperature detected by the temperature sensor. The device has advantages such as a high precision, good safety and an excellent visual effect.

16 Claims, 9 Drawing Sheets

INTELLIGENT THERMOSTATIC WATER OUTFLOWING DEVICE

BACKGROUND OF THE INVENTION

1. Field of Invention

The present invention relates to a water outflowing device, in particular, to an intelligent thermostatic water outflowing device in the field of sanitary wares.

2. Related Art

With the continual development of living standards, people are imposing higher and higher demands on sanitary products. In particular, the conventional water outflowing devices of sanitary products could not meet the demands of these people. In the prior art, the water outflowing devices of sanitary products, particularly the water outflowing devices in which the water temperature could be adjusted, have the defects as mentioned hereinafter. First, the adjusting of the outflowing water temperature could not be accomplished on demands, and the immediacy of the water temperature adjusting is not so ideal that the users have to make adjustments according to the actual outflowing water temperature. Second, when the outflowing water temperature varies, the automatic thermostatic adjusting process could not be accomplished, in which case the users have to make manual adjustments. Third, since there is only one single temperature adjusting function, the outflowing water could not be automatically shut off when the use is finished, and the device could not be automatically arranged in the outflowing water temperature state set last time or in the outflowing water temperature state newly set when the device is turned on again.

To this end, people have made long term exploration and proposed various kinds of solutions, some of which have been applied for a patent. For example, the Chinese Patent Application No. 200810061571 discloses an intelligent thermostatic valve having a valve body and a valve core, in which the inner cavity of the valve body is divided into a hot water cavity, a mixing water cavity and a cold water cavity in sequence. A hot water inlet, a warm water outlet, a cold water inlet and a cold water outlet are provided on the valve body. The warm water outlet is equipped with a warm water outlet nipple and the cold water inlet is equipped with a cold water inlet nipple. Valve ports are placed on both ends of the mixing water cavity. The valve core could be mounted within the mixing water cavity in such a way that it could move to and fro along the axial direction of the mixing water cavity. The plugs at both ends of the valve core are adapted with the valve ports at both ends of the mixing water cavity respectively, so as to control the ratio of cold water and hot water flowing into the mixing water cavity. One end of the valve core is connected with a linear step motor external to the valve body via a motor shaft. A warm water temperature sensor is mounted within the warm water outlet nipple. An inflowing water flow meter and an inflowing water flow sensor matched therewith are mounted within the cold water inlet nipple.

It is evident the outflowing water temperature could be automatically adjusted by using the aforementioned solution, but the whole structure of the device is relatively complicated and both a warm water temperature sensor and a water flow sensor have to be provided, bringing about a higher cost. In addition, the linear step motor is used to control the valve core to move in an axial direction to accomplish adjusting the temperature in this solution, which could only adjust the water temperature but could not turn on or shut off the outflowing water. Therefore, the solution could only be applied to adjust the water temperature in the pipes but could not be applicable to the ordinary valves.

SUMMARY OF THE INVENTION

In order to address the aforementioned problems, it is therefore an object of the present invention to provide an intelligent thermostatic water outflowing device which could accomplish automatic thermostatic adjusting of the outflowing water temperature and is simple in operation and use.

To achieve the object mentioned above, the present invention provides an intelligent thermostatic water outflowing device, comprising a body provided with a hot water inflowing passage, a cold water inflowing passage and a water outflowing passage, and a valve core assembly provided between the cold water inflowing passage, the hot water inflowing passage and the water outflowing passage within the body. The present device further includes a motor, a water temperature control circuit and a temperature sensor. The valve core rod of the valve core assembly is connected with the output shaft of the motor fixed within the body. The temperature sensor is placed in the water outflowing passage and connected with the water temperature control circuit. The water temperature control circuit is connected with the motor and has an external power source connected thereto for supplying the power. The operation of the motor could be controlled by the water temperature control circuit according to the outflowing water temperature detected by the temperature sensor.

The external power source could supply power for the water temperature control circuit, so that the operation of the motor could be controlled by the water temperature control circuit. Since the rotating shaft of the motor is connected with the valve core rod of the valve core assembly, the valve core assembly could adjust the ratio of the outflowing cold water and hot water when the valve core rod is driven to rotate by the rotating shaft of the motor, thus the outflowing water temperature could be adjusted. When the outflowing water temperature is determined, it would be brought to vary due to the difference in water pressures in the hot water inflowing passage and the cold water inflowing passage, the water temperature variances of the hot water inflowing passage and the cold water inflowing passage, and the like. In this regard, the temperature sensor could detect the water temperature variances of the water outflowing passage in time, and control the operation of the motor with the water temperature control circuit, thereby accomplishing adjusting the water temperature in time. Therefore, the outflowing water temperature from the water outflowing passage could be kept constant.

In the intelligent thermostatic water outflowing device, the device further includes a power generator fixed in the water outflowing passage. An impeller is fixed on the rotating shaft of the power generator. The power generator is directly connected with the water temperature control circuit or connected with the water temperature control circuit via a storage battery. The water temperature control circuit could disconnect the external power source from the water temperature control circuit when the power generator is in operation and/or the storage battery has power.

When there is not any power in the storage battery and the power generator is out of operation, the water temperature control circuit could not control the operation of the motor as no power is supplied thereto. In this case, there is a need for an external power source to continually supply power for the water temperature control circuit. When there is power in the storage or the power generator is in operation, the storage battery or the power generator could supply power for the water temperature control circuit, thereby controlling the operation of the motor in accordance with the water temperature states. In this respect, the operation of the motor could be controlled by the water temperature control circuit even without the external power source.

The water temperature control circuit could be supplied with power mainly in the following manners. First, when no power generator or storage battery is provided, the external power source would continually supply power for the water temperature control circuit to facilitate the operation of the motor. Second, in case a power generator other than a storage battery is provided, the external power source supplies power for the water temperate control circuit only when the power generator is out of operation during starting the whole device. Third, in case both a power generator and a storage battery are furnished, the external power source supplies power for the water temperate control circuit only when the storage battery does not have any power and the power generator is out of operation during starting the whole device.

In the intelligent thermostatic water outflowing device, the water temperature control circuit is connected with a control panel fixed on the body. A switch button is provided on the control panel for turning on or off the motor and a temperature adjusting button is further provided on the control panel for adjusting the water temperature. The valve core assembly is set in the outflowing water cut-off status when the switch button is in the off status.

By using the temperature adjusting button, the outflowing water temperature could be conveniently preset before the water is flown out, and the outflowing water temperature could be adjusted in time during the operation. The intelligent thermostatic water outflowing device could be turned on or off with the switch button. When the switch button is in the off status, the valve core assembly is driven by the motor to reset, so that the valve core assembly is in the outflowing water cut-off status; and when the switch button is in the on status, the valve core assembly is driven by the motor to be adjusted to the preset water temperature state. Generally speaking, the valve core assembly first communicates the cold water inflowing passage with the outflowing passage as soon as the switch button is pressed, so as to prevent the high temperature stream being flown out in the initial state, thereby improving the use safety.

In the intelligent thermostatic water outflowing device, the water temperature control circuit is a printed circuit board having a chip, and the water temperature control circuit is further connected with a temperature display which is fixed on the control panel. The set outflowing water temperature could be understood with the temperature display in an expedient way. This way, the user could immediately determine the water temperature and make corresponding adjustments.

In the intelligent thermostatic water outflowing device, the valve core assembly includes a static porcelain piece fixed within the body and a movable porcelain piece which could rotate relative to the static porcelain piece. A cold water inflowing hole, a hot water inflowing hole and a water outflowing hole are positioned on the static porcelain piece for communicating with the cold water inflowing passage, the hot water inflowing passage and the water outflowing passage respectively. The movable porcelain piece is fixedly connected with the valve core rod and could communicate the water outflowing hole of the static porcelain piece with the cold water inflowing hole and/or the hot water inflowing hole.

When the movable porcelain piece merely communicates the water outflowing hole with the cold water inflowing hole, the cold water flows out of the water outflowing passage. When the movable porcelain piece communicates the water outflowing hole with both the cold water inflowing hole and the hot water inflowing hole, warm water mixed by the hot water and the cold water flows out of the water outflowing passage, in which case the water temperature could be adjusted by conditioning the ratio of outflowing cold water and hot water. When the movable porcelain piece merely communicates the water outflowing hole with the hot water inflowing hole, the hot water flows out of the water outflowing passage.

In the intelligent thermostatic water outflowing device, a valve core cover is fixed within the body. One end of the valve core rod is passed through the valve core cover and a connecting hole is set at the end of the valve core rod. The motor is fixed on the valve core cover and a gear is connected with the output shaft of the motor. The connecting hole has a configuration matched with the outline of the gear provided on the inner wall thereof and the gear is inserted in the connecting hole.

In the intelligent thermostatic water outflowing device, the motor is a step motor. Said motor and water temperature control circuit are disposed at the same side of the valve core cover within the body. The other side of the valve core cover is fixedly connected with the valve core seat. The static porcelain piece, the movable porcelain piece and the valve core rod are mounted within the valve core seat.

The step motor could guarantee the reliability and precision in adjusting the water temperature. The motor and the water temperature control circuit are disposed at the same side of the valve core cover so that the stream could be prevented from affecting the operation thereof. Thus, the operation reliability is enhanced.

In the intelligent thermostatic water outflowing device, the motor is a deceleration step motor or a deceleration mechanism is provided between the output shaft of the motor and the gear. Such a configuration could efficiently improve the precision in adjusting the water temperature.

In the intelligent thermostatic water outflowing device, the device includes an illumination control circuit and an illuminator fixed at the water outlet of the water outflowing passage. The illumination control circuit is connected with the power generator and the temperature sensor respectively. The illuminator is connected with the illumination control circuit and the illumination control circuit could control the illuminator to emit lights of different colors with respect to different temperature ranges of the outflowing water detected by the temperature sensor when the impeller is driven to rotate by the stream and the power generator is thus operated.

The stream could drive the impeller to rotate when it passes the water outflowing passage, so that the power generator will be put in operation and generate the power. By using the power thus generated, the energy could be saved, and an additional illuminator control switch is not required since the power source would automatically shut off when there exists no stream. The temperature sensor would transmit the outflowing water temperature detected to the illumination control circuit, and the illumination control circuit could control the operation of the illuminator according to the signal from the temperature sensor. In this case, the user could visually perceive the water temperature states in accordance with the lights of different colors in a convenient way and would not be subject to scalding or cool irritation. The corresponding relation between the temperature ranges of the outflowing water and the colors of the lights could be set to demands. Furthermore, the lights emitted by the illuminator could be seen by the user with the stream, which not only increases the visual effects, but also performs an auxiliary illuminating function, thereby providing a very convenient use. Of course, the illumination control circuit could be integrated with the water temperature control circuit on one circuit board. The temperature sensor could provide a water temperature signal for the water temperature control circuit and the illumination control circuit at the same time.

In the intelligent thermostatic water outflowing device, a bubbler is fixed at the water outlet of the water outflowing passage. The bubbler includes a central seat having a through hole and a mounting seat set around the central seat. The central seat is integrated with the mounting seat and several water-air mixing holes are evenly distributed on the side wall of the central seat. The illuminator is a multi-color LED light which could emit lights of a plurality of colors and is inserted in the through hole. Several diversion posts are evenly distributed at the side of the water-air mixing holes within the central seat.

The illuminator could be readily mounted within the water outflowing passage with the bubbler. Moreover, the bubbler could produce a lot of bubbles when the stream passes through the bubbler. When the lights irradiate the stream mixed with bubbles, the lights mixed in the stream would become softer and more aesthetic by using a plurality of light broadcasting means, such as total reflection, reflection, scattering, refraction, convergence and interference of lights. In addition, the illuminator would not affect the normal operation of the bubbler when it is inserted in the bubbler, but makes the light sources in the center, thereby providing a better light broadcasting effect.

The bubbling effect would be efficiently increased as the stream and air come into the bubbler from the side. The diversion posts could make the stream uniformly flow to the water-air mixing holes, which produces a better bubbling effect.

The intelligent thermostatic water outflowing device has the following advantages over the prior art.

First, the outflowing water temperature could be preset. Since the sensor could detect the outflowing water temperature real time, the valve core assembly could be controlled by the motor when the water temperature varies. Therefore, the ratio of the outflowing cold water and hot water could be adjusted to achieve the purpose of providing thermostatic outflowing water. Besides, a high control precision could be obtained by the device.

Second, the valve core assembly is set in the outflowing water cut-off status when the switch button is in the off status, and thus the water outflowing device could be automatically shut off or turned on. Moreover, the valve core assembly firstly communicates the cold water inflowing passage with the water outflowing passage during starting the valve core assembly, in which case the high temperature stream would not flow out in the initial state, thereby improving the use safety.

Third, the user would be noticed of the outflowing water temperature with the prompting lights, and thus would not be subject to scalding or cool irritation. In addition, the stream flown out is mixed with the lights to produce a good visual effect and increase the sentiment in use.

Fourth, the water temperature could be preset and adjusted, and the valve core assembly could be reset by supplying power for the water temperature control circuit with, for example, the external power source, the power generator and the storage battery.

DETAILED DESCRIPTION OF THE INVENTION

First Embodiment

Figure 1:
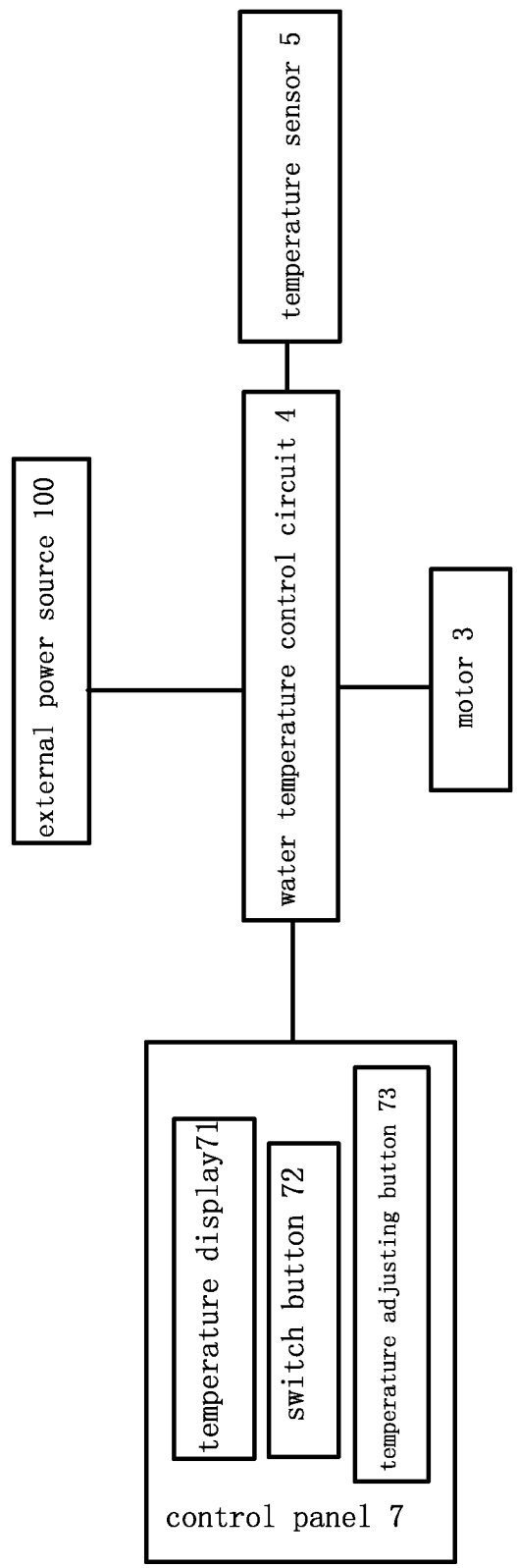
FIG. 1 is a circuit diagram of the first embodiment according to the invention.
Figure 2:
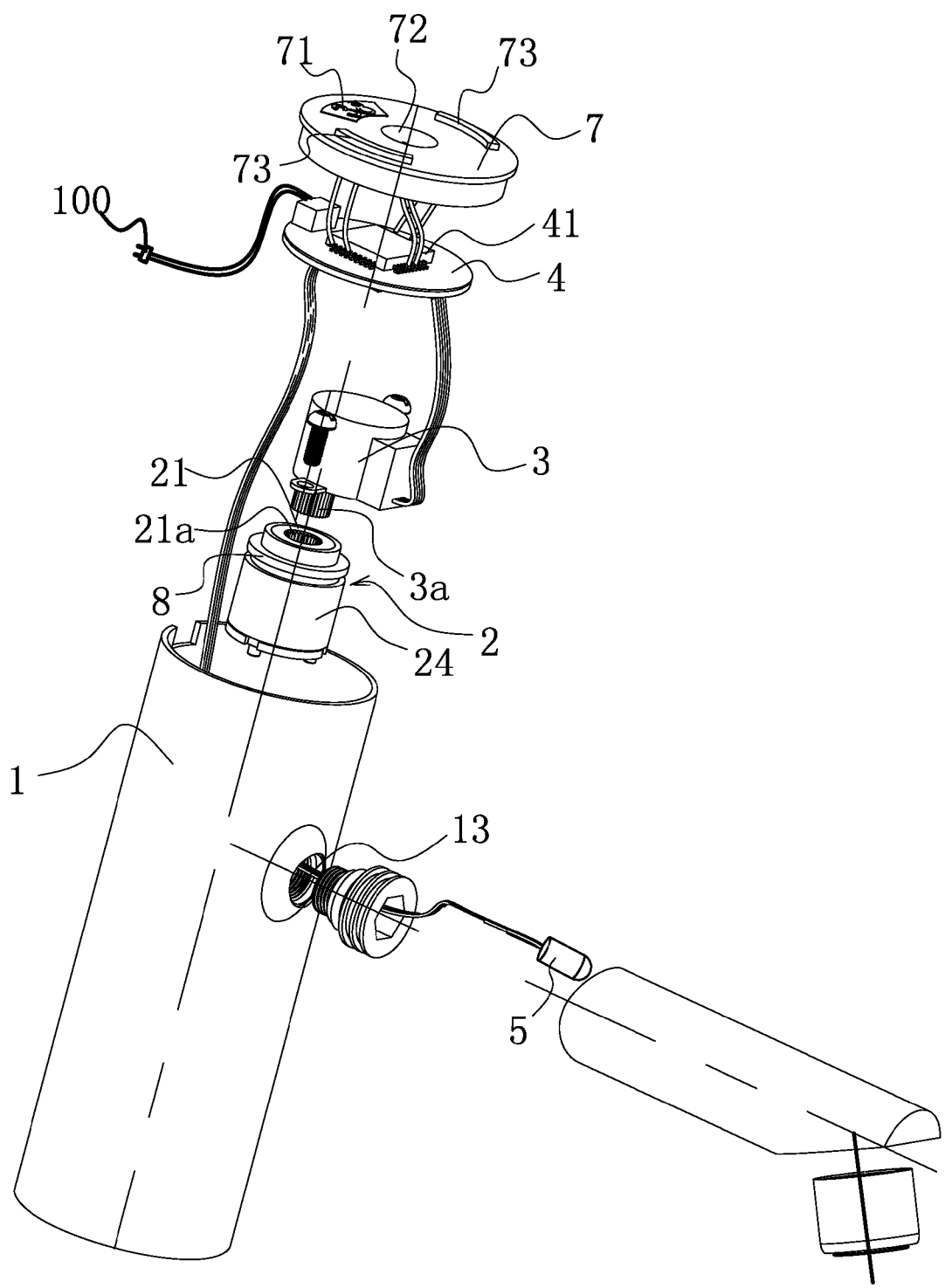
FIG. 2 is an exploded view of the first embodiment according to the invention.

As shown in FIGS. 1 and 2, the intelligent thermostatic water outflowing device comprises a body 1, a valve core assembly 2, a motor 3, a water temperature control circuit 4, a temperature sensor 5, an external power source 100, a control panel 7, and so on.

The body 1 is provided with a hot water inflowing passage 12, a cold water inflowing passage 11 and a water outflowing passage 13. A valve core assembly 2 is provided between the cold water inflowing passage 11, the hot water inflowing passage 12 and the water outflowing passage 13 within the body 1. The valve core rod 21 of the valve core assembly 2 is connected with the output shaft of the motor 3 fixed within the body 1. The temperature sensor 5 is placed in the water outflowing passage 13 and connected with the water temperature control circuit 4. The water temperature control circuit 4 is connected with the motor 3 and has an external power source 100 connected thereto for supplying the power. The operation of the motor 3 could be controlled by the water temperature control circuit 4 according to the outflowing water temperature detected by the temperature sensor 5.

The water temperature control circuit 4 is connected with a control panel 7 fixed on the body 1. A switch button 72 is provided on the control panel 7 for turning on or off the motor 3 and a temperature adjusting button 73 is further provided on the control panel 7 for adjusting the water temperature. The valve core assembly 2 is set in the outflowing water cut-off status when the switch button 72 is in the off status. The water temperature control circuit 4 is a printed circuit board having a chip 41. The water temperature control circuit 4 is further connected with a temperature display 71 which is fixed on the control panel 7.

Figure 5:
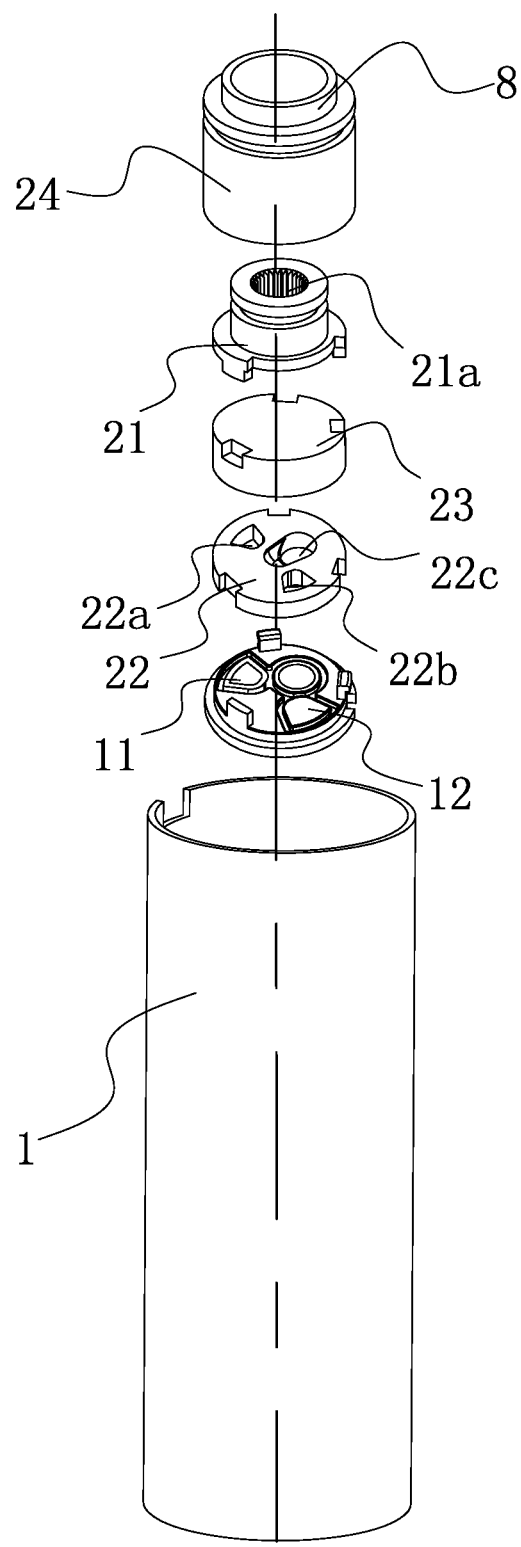
FIG. 5 is an exploded view of the valve core assembly according to the invention.

In FIG. 5, the valve core assembly includes a static porcelain piece 22 fixed within the body 1 and a movable porcelain piece 23 which could rotate relative to the static porcelain piece 22. A cold water inflowing hole 22a, a hot water inflowing hole 22b and a water outflowing hole 22c are positioned on the static porcelain piece 22 for communicating with the cold water inflowing passage 11, the hot water inflowing passage 12 and the water outflowing passage 13 respectively. The movable porcelain piece 23 is fixedly connected with the valve core rod 21 and could communicate the water outflowing hole 22c of the static porcelain piece 22 with the cold water inflowing hole 22a and/or the hot water inflowing hole 22b. A valve core cover 8 is fixed within the body 1. One end of the valve core rod 21 is passed through the valve core cover 8 and a connecting hole 21a is set at the end of the valve core rod 21. The motor 3 is fixed on the valve core cover 8 and a gear 3a is connected with the output shaft of the motor 3. The connecting hole 21a has a configuration matched with the outline of the gear 3a provided on the inner wall thereof and the gear 3a is inserted in the connecting hole 21a.

The motor 3 of this embodiment is a deceleration step motor. Said motor 3 and water temperature control circuit 4 are disposed at the same side of the valve core cover 8 within the body 1. The other side of the valve core cover 8 is fixedly connected with the valve core seat 24. The aforementioned static porcelain piece 22, movable porcelain piece 23 and valve core rod 21 are mounted within the valve core seat 24. The rotation precision of the valve core rod 21 could be higher since the deceleration step motor is used, in which case the rotation angle of the valve core rod 21 each time could be 0.5 degrees in minimum. The temperature adjusting precision of the device is very high as the minimum rotation angle of the valve ore rod 21 could be 0.5 degrees, in which case the temperature deviation would not exceed 0.5° C.

The external power source 100 of this embodiment continually provides power for the water temperature control circuit 4. During operation, since the rotating shaft of the motor 3 is connected with the valve core rod 21 of the valve core assembly 2, the ratio of cold water to hot water in the outflowing water could be adjusted by the valve core assembly 2 when the valve core rod 21 is driven by the rotating shaft of the motor 3 to rotate, thereby accomplishing adjusting the outflowing water temperature. When the outflowing water temperature is determined, it would be brought to vary due to the difference in water pressures in the hot water inflowing passage 12 and the cold water inflowing passage 11, the water temperature variances of the hot water inflowing passage 12 and the cold water inflowing passage 11, and the like. In this respect, the temperature sensor 5 would detect the water temperature variances of the water outflowing passage 13 in time, and control the operation of the motor 3 with the water temperature control circuit 4, thereby accomplishing adjusting the water temperature in time. Therefore, the outflowing water temperature from the water outflowing passage 13 could be kept constant.

In this embodiment, the valve core assembly 2 firstly communicates the cold water inflowing passage 11 with the water outflowing passage 13 as soon as the switch button 72 is pressed down, so as to prevent the stream of a high temperature from being flown out in the initial state, in which case the use safety is enhanced. The intelligent thermostatic water outflowing device could be controlled to start or stop by the switch button 72. When the switch button 72 is off, the valve core assembly 2 is brought by the motor 3 to reset, and the valve core assembly 2 is set in the outflowing water cut-off status. When the switch button 72 is on, the valve core assembly 2 is adjusted to the status of a predetermined water temperature by the motor 3.

Second Embodiment

Figure 3:
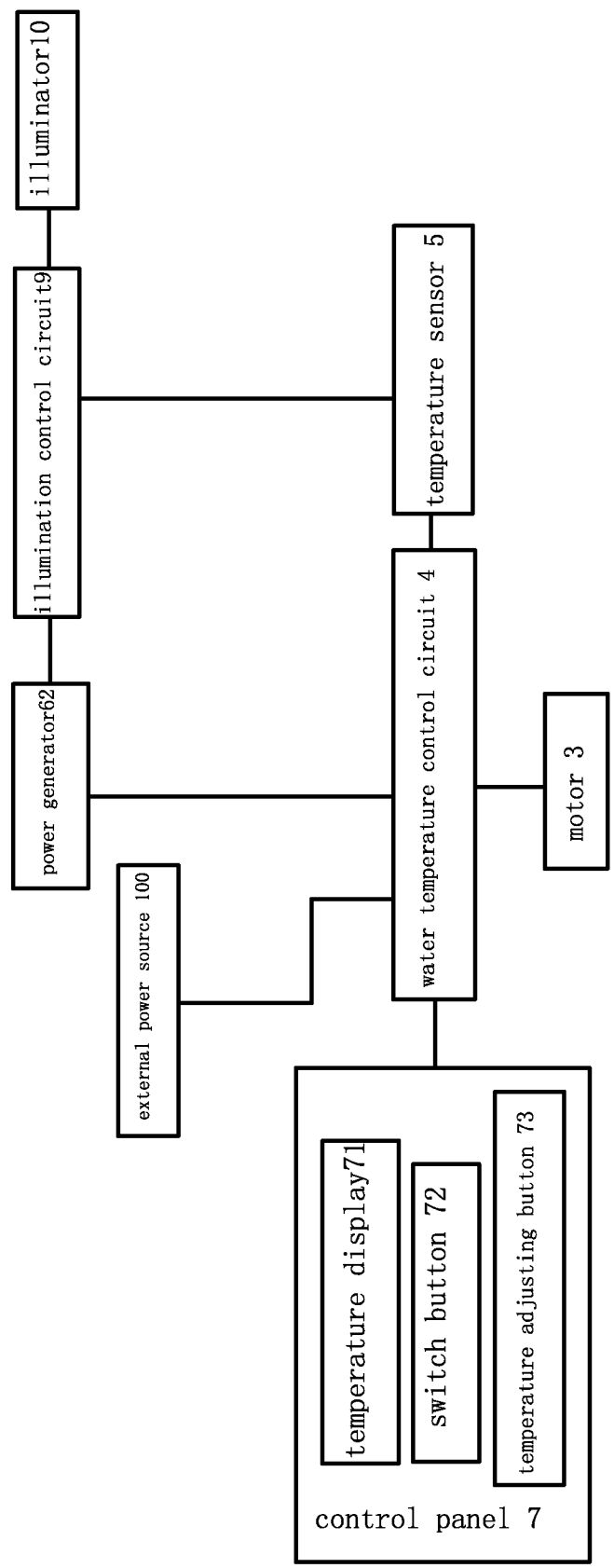
FIG. 3 is a circuit diagram of the second embodiment according to the invention
Figure 4:
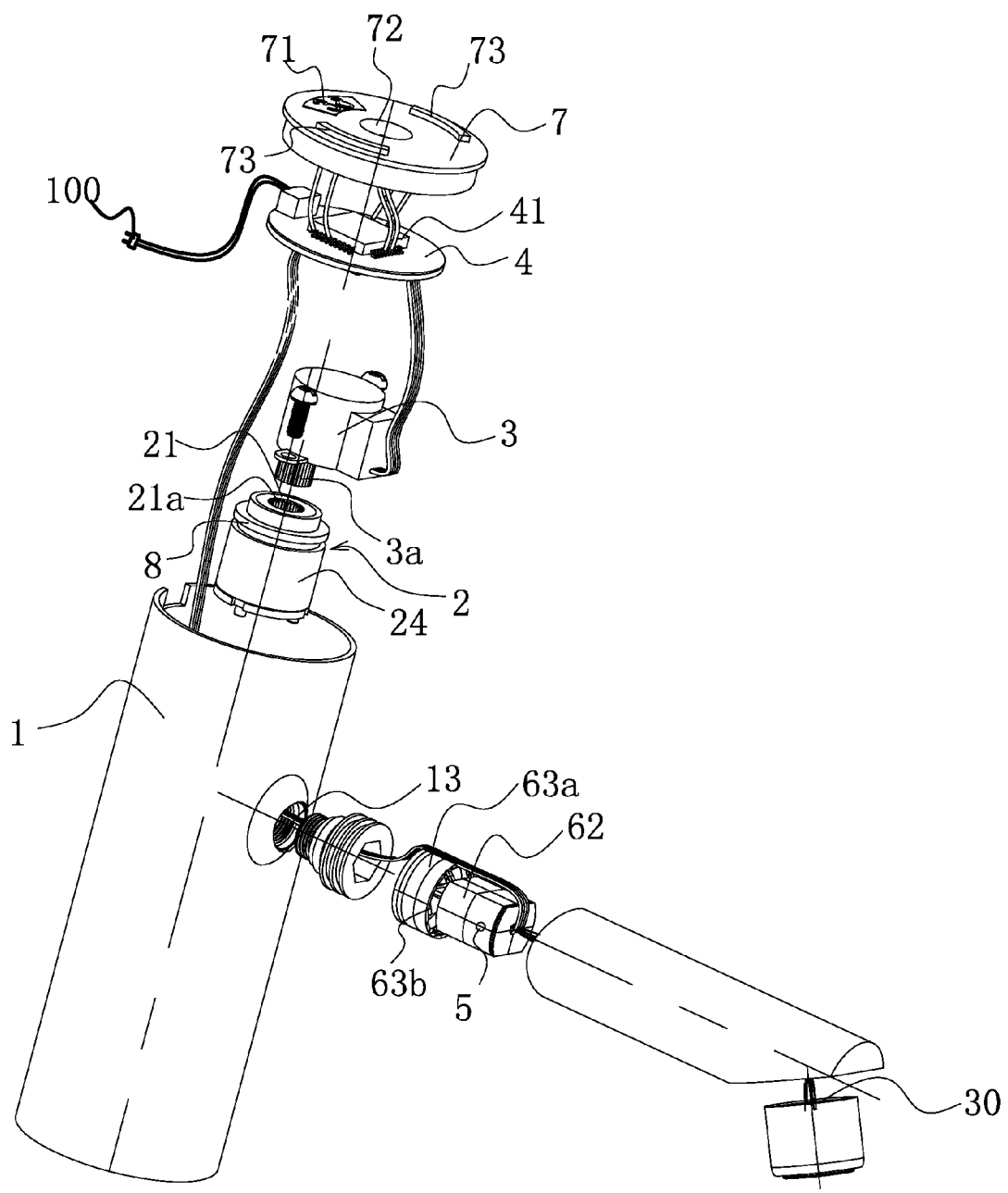
FIG. 4 is an exploded view of the second embodiment according to the invention.

As shown in FIGS. 3 and 4, the present device further includes a power generator 62 fixed in the water outflowing passage 13. An impeller 63 is fixed on the rotating shaft of the power generator 62. The power generator 62 is directly connected with the water temperature control circuit 4. The water temperature control circuit 4 could disconnect the external power source 100 from the water temperature control circuit 4 when the power generator 62 is in operation.

The device further includes an illumination control circuit 9 and an illuminator 10 fixed at the water outlet of the water outflowing passage 13. The illumination control circuit 9 is connected with the power generator 62 and the temperature sensor 5 respectively. The illuminator 10 is connected with the illumination control circuit 9 and the illumination control circuit 9 could control the illuminator 10 to emit lights of different colors with respect to different temperature ranges of the outflowing water detected by the temperature sensor 5 when the impeller 63 is driven to rotate by the stream and the power generator 62 is thus operated.

Figure 8:
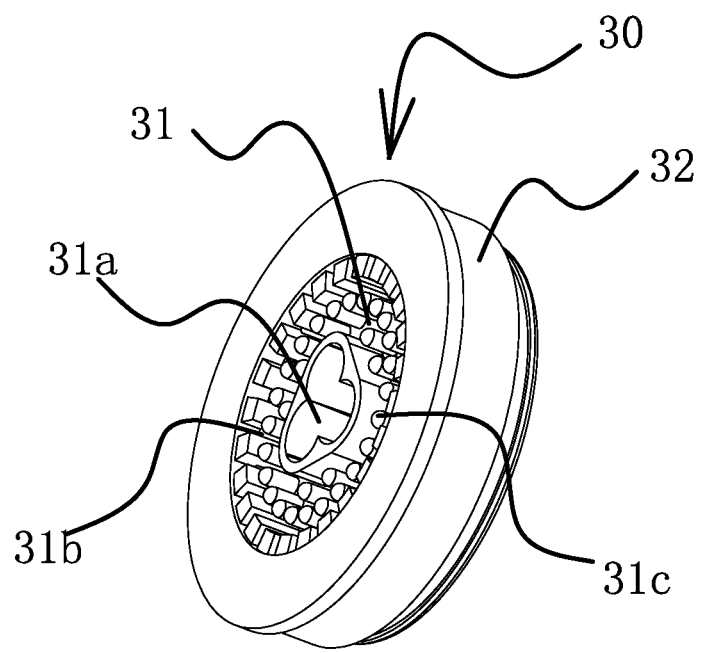
FIG. 8 is a stereogram of the bubbler according to the invention.

In FIG. 8, a bubbler 30 is fixed at the water outlet of the water outflowing passage 13. The bubbler 30 includes a central seat 31 having a through hole 31a and a mounting seat 32 set around the central seat 31. The central seat 31 is integrated with the mounting seat 32 and several water-air mixing holes 31b are evenly distributed on the side wall of the central seat 31. The illuminator 10 is a multi-color LED light which could emit lights of a plurality of colors and is inserted in the through hole 31a. Several diversion posts 31c are evenly distributed at the side of the water-air mixing holes 31b within the central seat 31.

Figure 6:
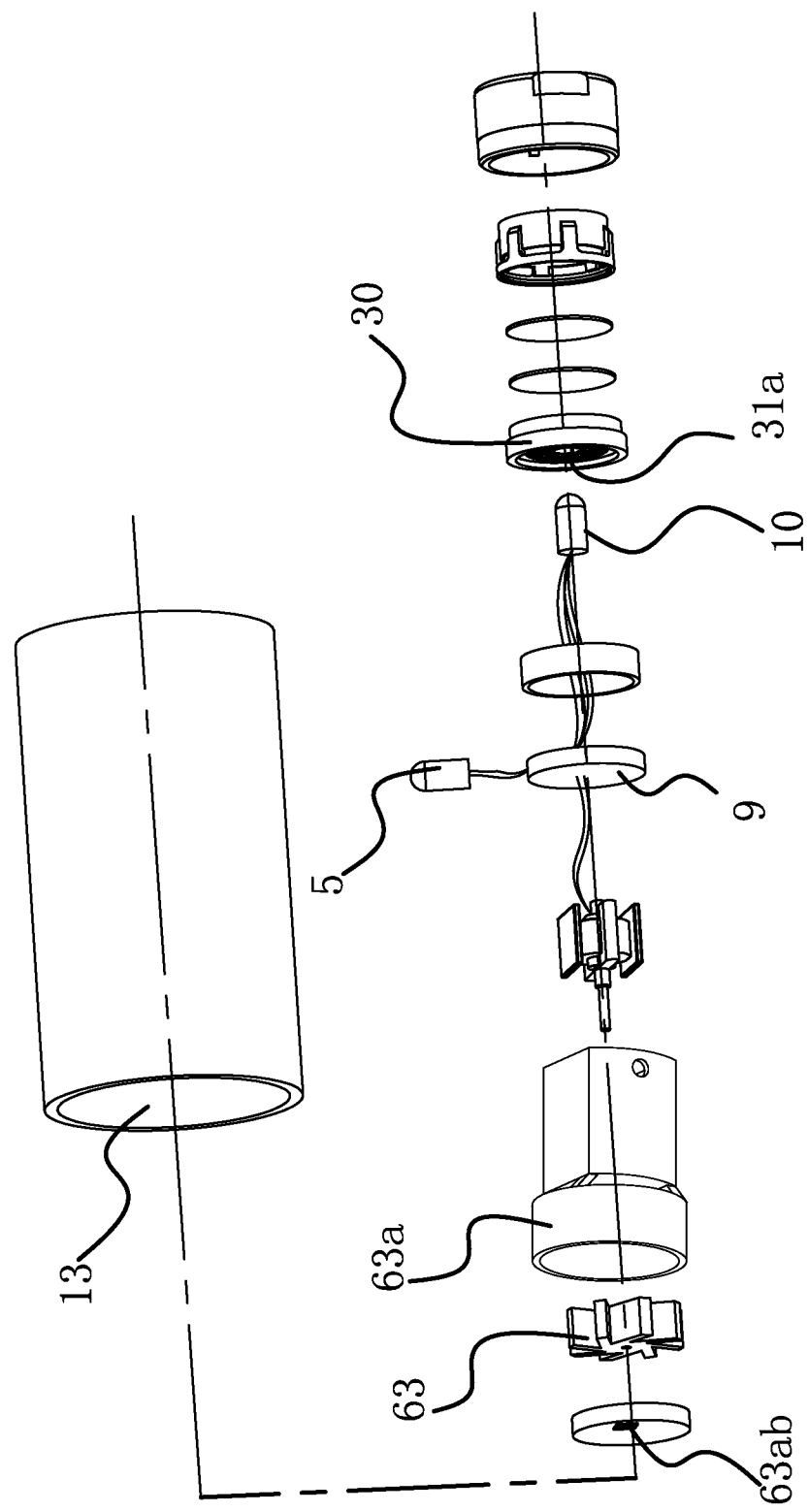
FIG. 6 is an exploded view of a portion of components of the second embodiment according to the invention.
Figure 7:
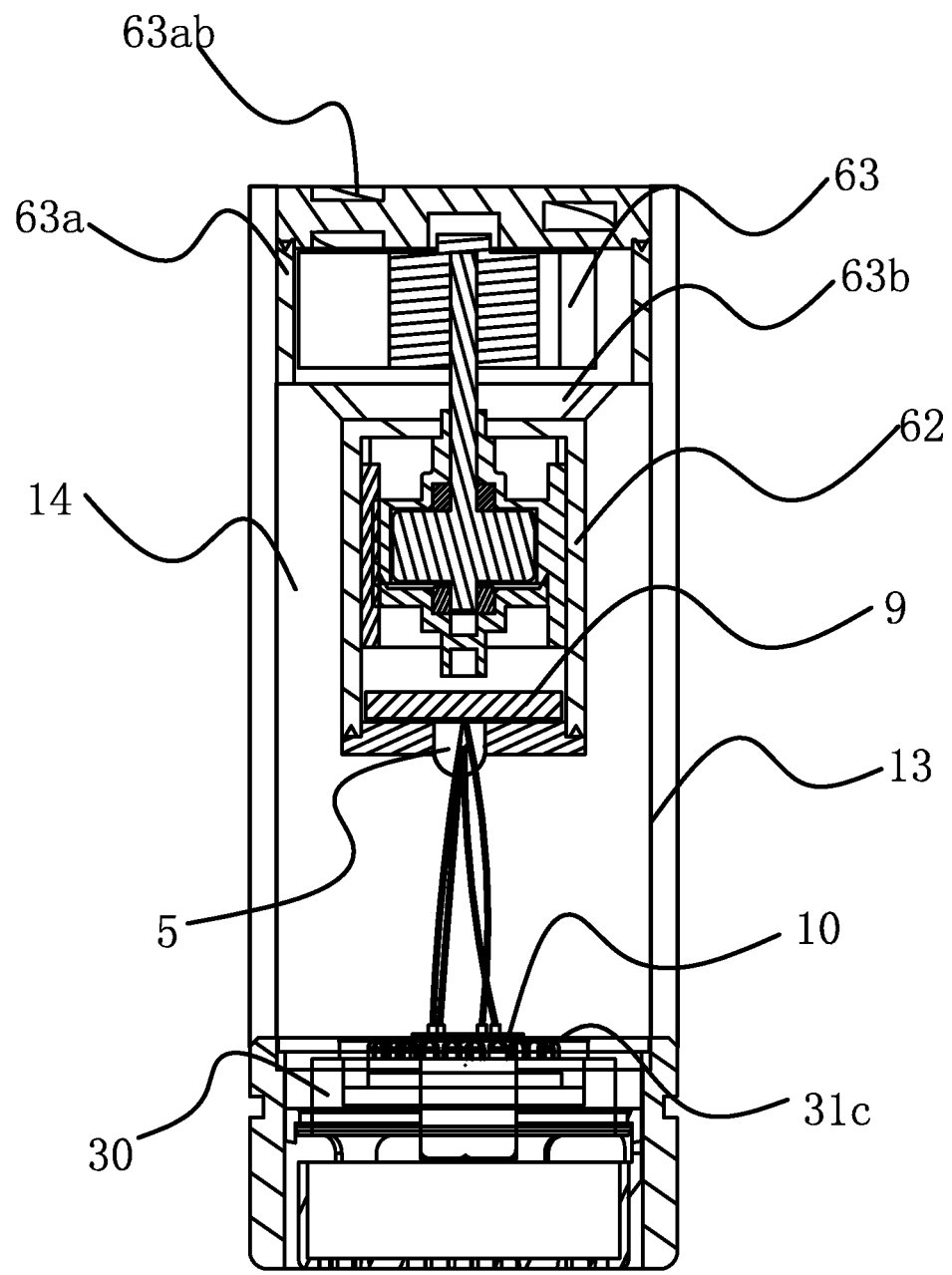
FIG. 7 is a sectional view of a portion of components of the second embodiment according to the invention.

As shown in FIGS. 6 and 7, in this embodiment, the housing of the power generator 62 is enclosed. An annular water passing gap 14 is provided between the outer wall of the generator housing and the inner wall of the water outflowing passage 13. An impeller tube 63a is provided at one end of the generator housing, which is fixedly connected to the water outflowing passage 13 and set around the impeller 63. A diversion water through hole 63b is positioned at the connecting end of the impeller tube 63a with the generator housing for communicating with the water passing gap 14. The diversion water through hole 63b is uniformly positioned in a circumferential direction. In said embodiment, the impeller tube 63a is firmly fitted into the water outflowing passage 13 and is integrated with the generator housing. Four water inflowing holes 63ab are set on the impeller tube 63a, which are away from the center of the impeller tube 63a and obliquely positioned. The stream could obliquely enter and form a vortex with the water inflowing holes 63ab thus configured, so as to drive the impeller 63 to rotate.

The illumination control circuit 9 is enclosed within the housing of the power generator 62, and connected with the illuminator 10 out of the generator housing via the wire passing through the generator end cover of the generator housing. The temperature sensor 5 is sealingly fixed on the generator housing and partly extends out of the generator housing.

During operation, the power produced by the power generator 62 could be used to supply power for the water temperature control circuit 4, so that the operation of the power generator 3 could be controlled by the water temperature control circuit 4. The external power source 100 supplies power for the water temperature control circuit 4 only when the power generator 52 is out of operation during starting the whole device.

In this embodiment, the illumination control circuit 9 could control the illuminator 10 to emit a blue light when the temperate sensor 5 detects the outflowing water temperature is lower than 30° C. The illumination control circuit 9 could control the illuminator 10 to emit a green light when the temperate sensor 5 detects the outflowing water temperature is within 30° C.~36° C. The illumination control circuit 9 could control the illuminator 10 to emit a red light when the temperate sensor S detects the outflowing water temperature is higher than 36° C.

Third Embodiment

Figure 9:
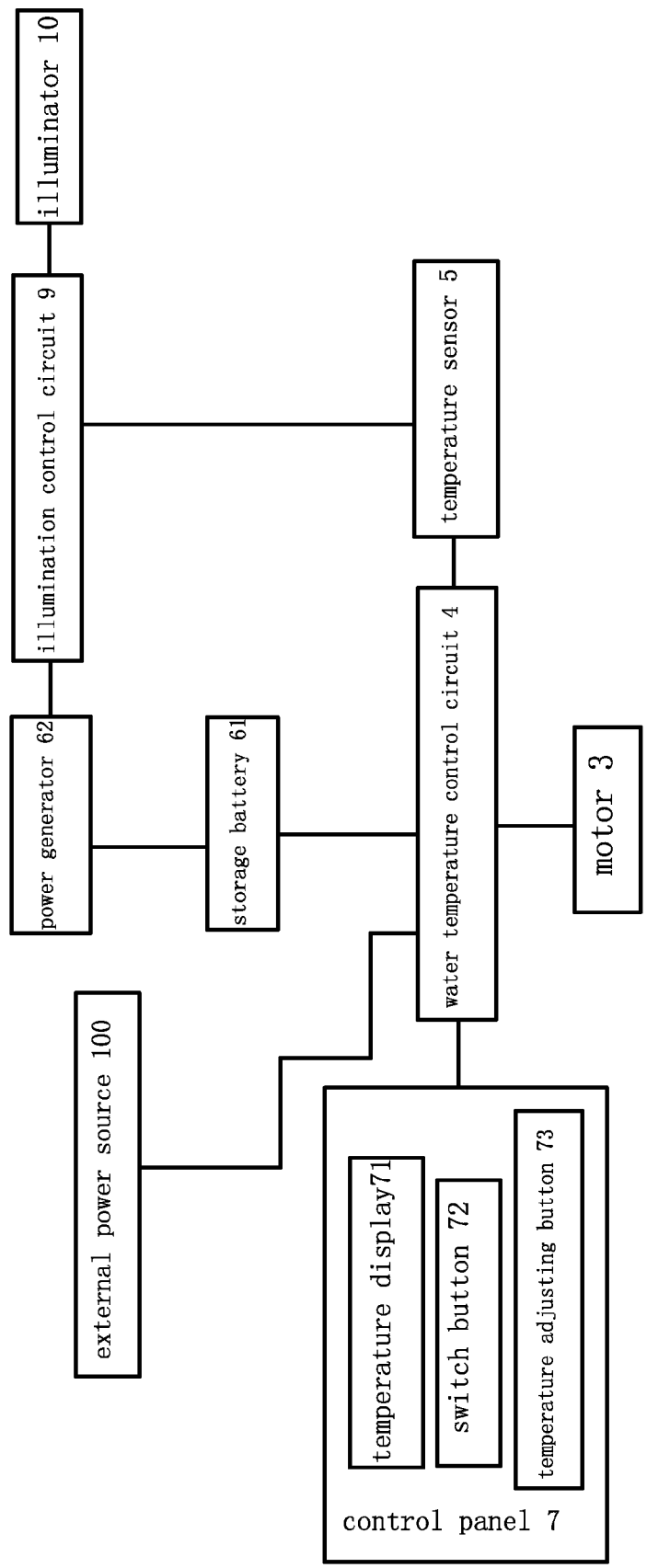
FIG. 9 is a circuit diagram of the third embodiment according to the invention.

As shown in FIG. 9, in this embodiment, the power generator 62 is connected to the water temperature control circuit 4 via a storage battery 61. The external power source supplies power for the water temperature control circuit 4 only when the storage battery 61 does not have power and the power generator 62 is out of operation during starting the whole device. The remaining parts of this embodiment are similar to those of the second embodiment and thus not further described herein for the purpose of brevity.

The specific embodiments described herein are merely illustrative, by way of example, of the spirit of the invention. It would be obvious to those skilled in the art that various kinds of modifications, amendments or other alternatives could be made to the specific embodiments described above, without departing from the spirit or extending beyond the scope defined in the accompanying claims.

Although terms such as body 1, hot water inflowing passage 11, cold water inflowing passage 12, water outflowing passage 13, water passing gap 14, valve core assembly 2, valve core rod 21, connecting hole 21a, static porcelain piece 22, cold water inflowing hole 22a, hot water inflowing hole 22b, water outflowing hole 22c, movable porcelain piece 23, valve core seat 24, motor 3, gear 3a, water temperature control circuit 4, chip 41, temperature sensor 5, storage battery 61, power generator 62, impeller 63, impeller tube 63a, diversion water through hole 63b, water inflowing hole 63ab, control panel 7, temperature display 71, switch button 72, temperature adjusting button 73, valve core cover 8, illumination control circuit 9, illuminator 10, LED light 10a, bubbler 30, central seat 31, through hole 31a, water-air mixing hole 31b, diversion post 31c, mounting seat 32, external power source 100 and the like, other terms are not excluded being used. Said terms are merely used to describe and explain the essence of the invention more conventionally. It is in violation of the spirit of the invention to interpret these terms as an additional limitation.

LIST OF REFERENCE NUMERALS 1 body
11 hot water inflowing passage
12 cold water inflowing passage
13 water outflowing passage
14 water passing gap
2 valve core assembly
21 valve core rod
21a connecting hole
22 static porcelain piece
22a cold water inflowing hole
22b hot water inflowing hole
22c water outflowing hole
23 movable porcelain piece
24 valve core seat
3 motor
3a gear
4 water temperature control circuit
41 chip
5 temperature sensor
61 storage battery
62 power generator
63 impeller
63a impeller tube
63b diversion through hole
63ab water inflowing hole
7 control panel
71 temperature display
72 switch button
73 temperature adjusting button
8 valve core cover
9 illumination control circuit
10 illuminator
10a LED light
30 bubbler
31 central seat
31a through hole
31b water-air mixing hole
31c diversion post
32 mounting seat
100 external power source

The invention claimed is:

1. An intelligent thermostatic water outflowing device, comprising:
a body (1) provided with a hot water inflowing passage (12), a cold water inflowing passage (11) and a water outflowing passage (13);
a valve core assembly (2) having a valve core rod (21), the valve core assembly (2) provided between the cold water inflowing passage (11), the hot water inflowing passage (12) and the water outflowing passage (13) within the body (1);
a static porcelain piece (22) of the valve core assembly (2), fixed within the body (1);
a cold water inflowing hole (22a), a hot water inflowing hole (22b) and a water outflowing hole (22c) positioned on the static porcelain piece (22) for communicating with the cold water inflowing passage (11), the hot water inflowing passage (12) and the water outflowing passage (13), respectively;
a movable porcelain piece (23) fixedly connected with the valve core rod (21), the movable porcelain piece (23) capable of rotating relative to the static porcelain piece (22) and capable of communicating with the water outflowing hole (22c) of the static porcelain piece (22), with the cold water inflowing hole (22a), and/or with the hot water inflowing hole (22b);
a valve core cover (8) fixed within the body (1), with one end of the valve core rod (21) passing through the valve core cover (8);
an output shaft of a motor (3), the motor (3) fixedly connected to the valve core cover (8) in the body (1) and connected to the valve core rod (21);
a gear (3a) connected to the output shaft of the motor (3);
a connecting hole (21a) set at the end of the valve core rod (21), the connecting hole (21a) having an inner wall with a configuration matching an outline of the gear (3a), the gear (3a) inserted into the connecting hole (21a); and
a water temperature control circuit (4) and a temperature sensor (5), the temperature sensor (5) placed in the water outflowing passage (13) and connected with the water temperature control circuit (4), the water temperature control circuit (4) connected with the motor (3) and having an external power source (100) connected thereto for supplying the power, and the operation of the motor (3) capable of being controlled by the water temperature control circuit (4) according to the outflowing water temperature detected by the temperature sensor (5).

2. The intelligent thermostatic water outflowing device as claimed in claim 1, wherein the device further includes a power generator (62) fixed in the water outflowing passage (13), an impeller (63) is fixed on the rotating shaft of the power generator (62), the power generator (62) is directly connected with the water temperature control circuit (4) or connected with the water temperature control circuit (4) via a storage battery (61), the water temperature control circuit (4) could disconnect the external power source (100) from the water temperature control circuit (4) when the power generator (62) is in operation and/or the storage battery (61) has power.

3. The intelligent thermostatic water outflowing device as claimed in claim 2, wherein the water temperature control circuit (4) is connected with a control panel (7) fixed on the body (1), a switch button (72) is provided on the control panel (7) for turning on or off the motor (3) and a temperature adjusting button (73) is further provided on the control panel (7) for adjusting the water temperature, and the valve core assembly (2) is set in the outflowing water cut-off status when the switch button (72) is in the off status.

4. The intelligent thermostatic water outflowing device as claimed in claim 3, wherein the water temperature control circuit (4) is a printed circuit board having a chip (41), and the water temperature control circuit (4) is further connected with a temperature display (71) which is fixed on the control panel (7).

5. The intelligent thermostatic water outflowing device as claimed in claim 2, wherein the motor (3) is a step motor, said motor (3) and water temperature control circuit (4) are disposed at the same side of the valve core cover (8) within the body (1), the other side of the valve core cover (8) is fixedly connected with the valve core seat (24), and the static porcelain piece (22), the movable porcelain piece (23) and the valve core rod (21) are mounted within the valve core seat (24).

6. The intelligent thermostatic water outflowing device as claimed in claim 5, wherein the motor (3) is a deceleration step motor or a deceleration mechanism is provided between the output shaft of the motor (3) and the gear (3a).

7. The intelligent thermostatic water outflowing device as claimed in claim 2, wherein the device includes an illumination control circuit (9) and an illuminator (10) fixed at the water outlet of the water outflowing passage (13), the illumination control circuit (9) is connected with the power generator (62) and the temperature sensor (5) respectively, the illuminator (10) is connected with the illumination control circuit (9) and the illumination control circuit (9) could control the illuminator (10) to emit lights of different colors with respect to different temperature ranges of the outflowing water detected by the temperature sensor (5) when the impeller (63) is driven to rotate by the stream and the power generator (62) is thus operated.

8. The intelligent thermostatic water outflowing device as claimed in claim 7, wherein a bubbler (30) is fixed at the water outlet of the water outflowing passage (13), the bubbler (30) includes a central seat (31) having a through hole 31a and a mounting seat (32) set around the central seat (31), the central seat (31) is integrated with the mounting seat (32) and several water-air mixing holes (31b) are evenly distributed on the side wall of the central seat (31), the illuminator (10) is a multi-color LED light which could emit lights of a plurality of colors and is inserted in the through hole (31a), and several diversion posts (31c) are evenly distributed at the side of the water-air mixing holes (31b) within the central seat (31).

9. The intelligent thermostatic water outflowing device as claimed in claim 8, wherein the water outflowing passage (13) is a faucet spout.

10. The intelligent thermostatic water outflowing device as claimed in claim 2, wherein the water outflowing passage (13) is a faucet spout.

11. The intelligent thermostatic water outflowing device as claimed in claim 1, wherein the water temperature control circuit (4) is connected with a control panel (7) fixed on the body (1), a switch button (72) is provided on the control panel (7) for turning on or off the motor (3) and a temperature adjusting button (73) is further provided on the control panel (7) for adjusting the water temperature, and the valve core assembly (2) is set in the outflowing water cut-off status when the switch button (72) is in the off status.

12. The intelligent thermostatic water outflowing device as claimed in claim 11, wherein the water temperature control circuit (4) is a printed circuit board having a chip (41), and the water temperature control circuit (4) is further connected with a temperature display (71) which is fixed on the control panel (7).

13. The intelligent thermostatic water outflowing device as claimed in claim 1, wherein the motor (3) is a step motor, said motor (3) and water temperature control circuit (4) are disposed at the same side of the valve core cover (8) within the body (1), the other side of the valve core cover (8) is fixedly connected with the valve core seat (24), and the static porcelain piece (22), the movable porcelain piece (23) and the valve core rod (21) are mounted within the valve core seat (24).

14. The intelligent thermostatic water outflowing device as claimed in claim 13, wherein the motor (3) is a deceleration step motor or a deceleration mechanism is provided between the output shaft of the motor (3) and the gear (3a).

15. The intelligent thermostatic water outflowing device as claimed in claim 1, wherein the device includes an illumination control circuit (9) and an illuminator (10) fixed at the water outlet of the water outflowing passage (13), the illumination control circuit (9) is connected with the power generator (62) and the temperature sensor (5) respectively, the illuminator (10) is connected with the illumination control circuit (9) and the illumination control circuit (9) could control the illuminator (10) to emit lights of different colors with respect to different temperature ranges of the outflowing water detected by the temperature sensor (5) when the impeller (63) is driven to rotate by the stream and the power generator (62) is thus operated.

16. The intelligent thermostatic water outflowing device as claimed in claim 15, wherein a bubbler (30) is fixed at the water outlet of the water outflowing passage (13), the bubbler (30) includes a central seat (31) having a through hole 31a and a mounting seat (32) set around the central seat (31), the central seat (31) is integrated with the mounting seat (32) and several water-air mixing holes (31b) are evenly distributed on the side wall of the central seat (31), the illuminator (10) is a multi-color LED light which could emit lights of a plurality of colors and is inserted in the through hole (31a), and several diversion posts (31c) are evenly distributed at the side of the water-air mixing holes (31b) within the central seat (31).

\* \* \* \* \*